(12) United States Patent
Tonooka

(10) Patent No.: US 6,457,744 B1
(45) Date of Patent: Oct. 1, 2002

(54) AIRBAG APPARATUS FOR VEHICLE

(75) Inventor: Masami Tonooka, Fuji (JP)

(73) Assignee: Nihon Plast Co., Ltd. (JP)

( * ) Notice: Subject to any disclaimer, the term of this patent is extended or adjusted under 35 U.S.C. 154(b) by 0 days.

(21) Appl. No.: 09/521,061

(22) Filed: Mar. 8, 2000

(30) Foreign Application Priority Data

Mar. 24, 1999 (JP) .......................................... 11-080196

(51) Int. Cl.⁷ .............................................. B60R 21/26
(52) U.S. Cl. .................................... 280/732; 280/743.1
(58) Field of Search ............................ 280/743.1, 729, 280/732, 728.1, 739

(56) References Cited

U.S. PATENT DOCUMENTS

| | | | | |
|---|---|---|---|---|
| 5,746,447 A | * | 5/1998 | Dyer et al. | 280/743.2 |
| 5,791,685 A | * | 8/1998 | Lachat et al. | 280/743.1 |
| 5,906,391 A | * | 5/1999 | Weir et al. | 280/729 |
| 5,951,038 A | * | 9/1999 | Taguchi et al. | 280/729 |
| 5,957,486 A | * | 9/1999 | Taguchi et al. | 280/729 |
| 5,971,431 A | * | 10/1999 | Wohllebe et al. | 280/732 |
| 6,158,765 A | * | 12/2000 | Sinnhuber | 280/728.3 |
| 6,170,857 B1 | * | 1/2001 | Okada et al. | 280/728.1 |
| 6,247,727 B1 | * | 6/2001 | Hamada et al. | 280/743.1 |
| 6,299,202 B1 | * | 10/2001 | Okada et al. | 208/732 |

FOREIGN PATENT DOCUMENTS

JP         08268213        10/1996

* cited by examiner

*Primary Examiner*—Paul N. Dickson
*Assistant Examiner*—Toan C To
(74) *Attorney, Agent, or Firm*—Kilpatrick Stockton LLP

(57) ABSTRACT

An airbag apparatus for a vehicle has a case with an opening that is blocked by a cover that can be burst open, an airbag folded up within the case, and an inflator that ejects gas via a gas guide port into the airbag. Gas ejected from the inflator inflates the airbag inside the case, so as to burst the cover, enabling the airbag to deploy within the vehicle passenger compartment. The airbag branches at the gas guide port into a small-capacity sub-expansion part and a large-capacity main expansion part, the sub-expansion part being disposed on a front window panel side positioned at the front of the passenger compartment, and the main expansion part being positioned toward a passenger in the passenger compartment.

13 Claims, 15 Drawing Sheets

AIRBAG APPARATUS FOR VEHICLE

BACKGROUND OF THE INVENTION

The invention relates to an airbag apparatus for a vehicle, and more particularly to an airbag apparatus for a passenger seat.

In Japanese Patent Application Laid-Open publication H8-268213, there is a disclosure of an airbag apparatus.

In the above-noted airbag apparatus, an airbag module is installed in an instrument panel disposed below a front window. The airbag module houses within it an airbag folded up inside a case having an aperture blocked by a cover which can be burst open, and an inflator for ejecting gas into the airbag. When a collision occurs, the gas is ejected into the airbag, thereby causing the airbag to burst the cover open, and enabling it to deploy within the passenger compartment of the vehicle.

SUMMARY OF THE INVENTION

According to an investigation made by the present inventor, in an airbag apparatus, in order to achieve reliable bursting open of the cover by the airbag, it is preferable that a high-output inflator is used, so as to raise the pressure inside the airbag as much as possible.

From the standpoint of restraining an occupant of the vehicle with the airbag, it is preferable that the internal pressure of the airbag is adjusted so as to achieve an appropriate condition of restraint of a passenger.

Therefore, one method that can be envisioned is forming a vent hole that allows appropriate escape of the gas inside the airbag from therewithin, thereby adjusting the internal pressure.

If a vent hole is formed in the airbag so as to escape the internal pressure of the airbag, however, merely forming a hole in the base cloth of the airbag could result in the vent hole being torn by the strong force of the ejected gas.

For this reason, there is a need to use a strong material, for example, and to provide a special strong reinforcement at the edge part of the vent hole. This configuration, however, is not desirable because it causes complicated construction of the airbag.

Accordingly, in view of the above-noted analysis, it is an object of the present invention to provide an airbag apparatus for a vehicle which does not rely solely on a vent hole in enabling adjustment of the internal pressure of the airbag.

To achieve the above object, an airbag apparatus according to the present invention has a case with an opening that is blocked by a cover that can be burst open, a folded-up airbag installed within the case, and an inflator for ejecting gas into the airbag installed within the case, via a gas guide port. The airbag, which is expanded by the gas ejected from the inflator causes the cover to burst open, enabling its deployment within the passenger compartment of the vehicle. The airbag is branched from the gas guide port to a small-capacity sub-expansion part and a large-capacity main expansion part. Here, the sub-expansion part is disposed at the front window panel side of the front portion of the passenger compartment, and the main expansion part is disposed at the passenger side of the passenger compartment.

According to the above-noted configuration, preferably adjusting the internal airbag pressure and using a relatively small pressure, it is possible that the entire airbag is caused to deploy quickly in a desired direction.

DETAILED DESCRIPTION OF THE PREFERRED EMBODIMENTS

Embodiments of the present invention are described in detail below, with references made to relevant accompanying drawings.

First, the first embodiment of an airbag apparatus for a vehicle according to the present invention is described below, with references being made to FIG. 1 to FIG. 9.

Figure 1:
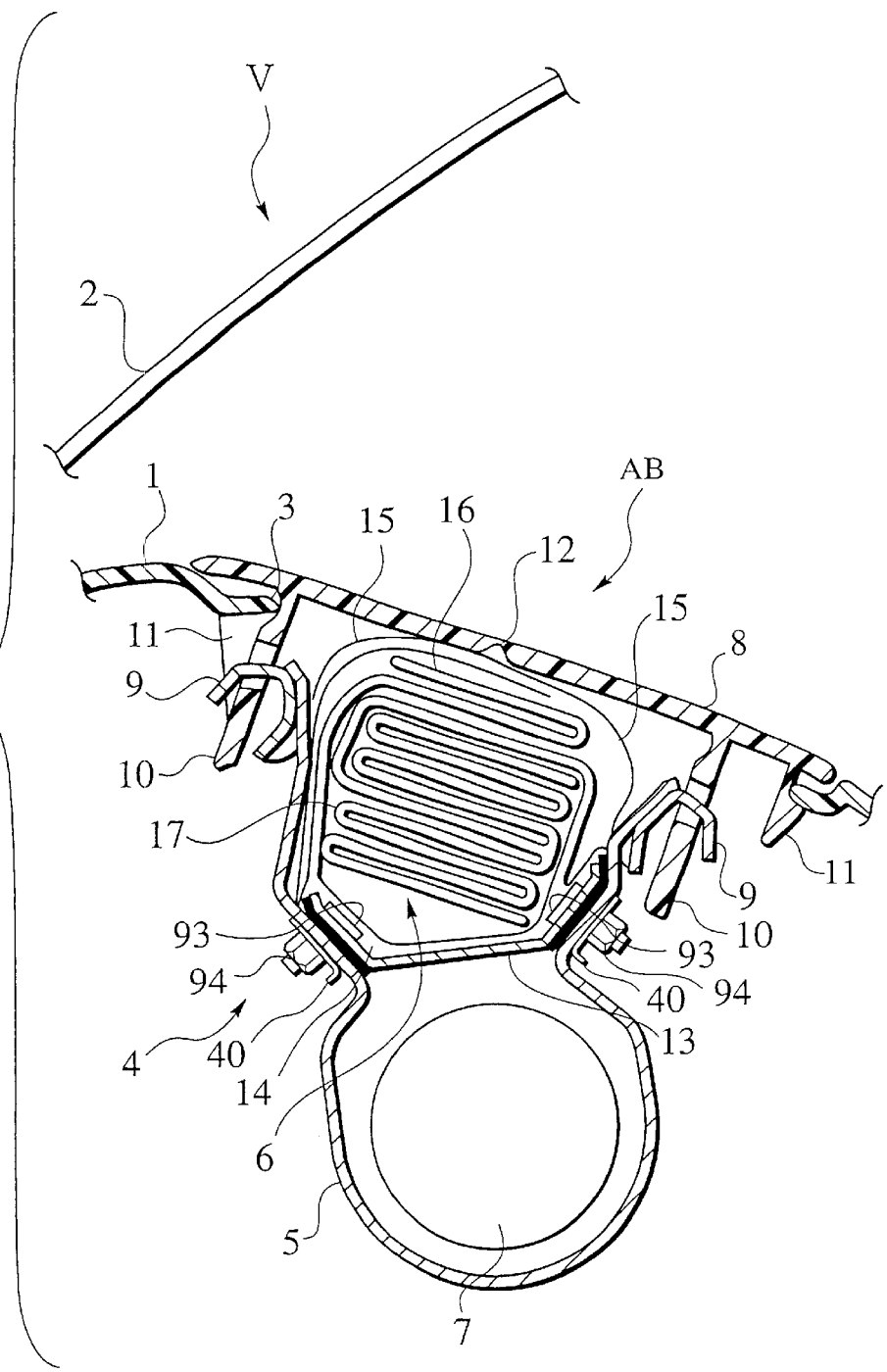
FIG. 1 is a cross-sectional view showing an airbag apparatus according to the first embodiment of the present invention.
Figure 2:
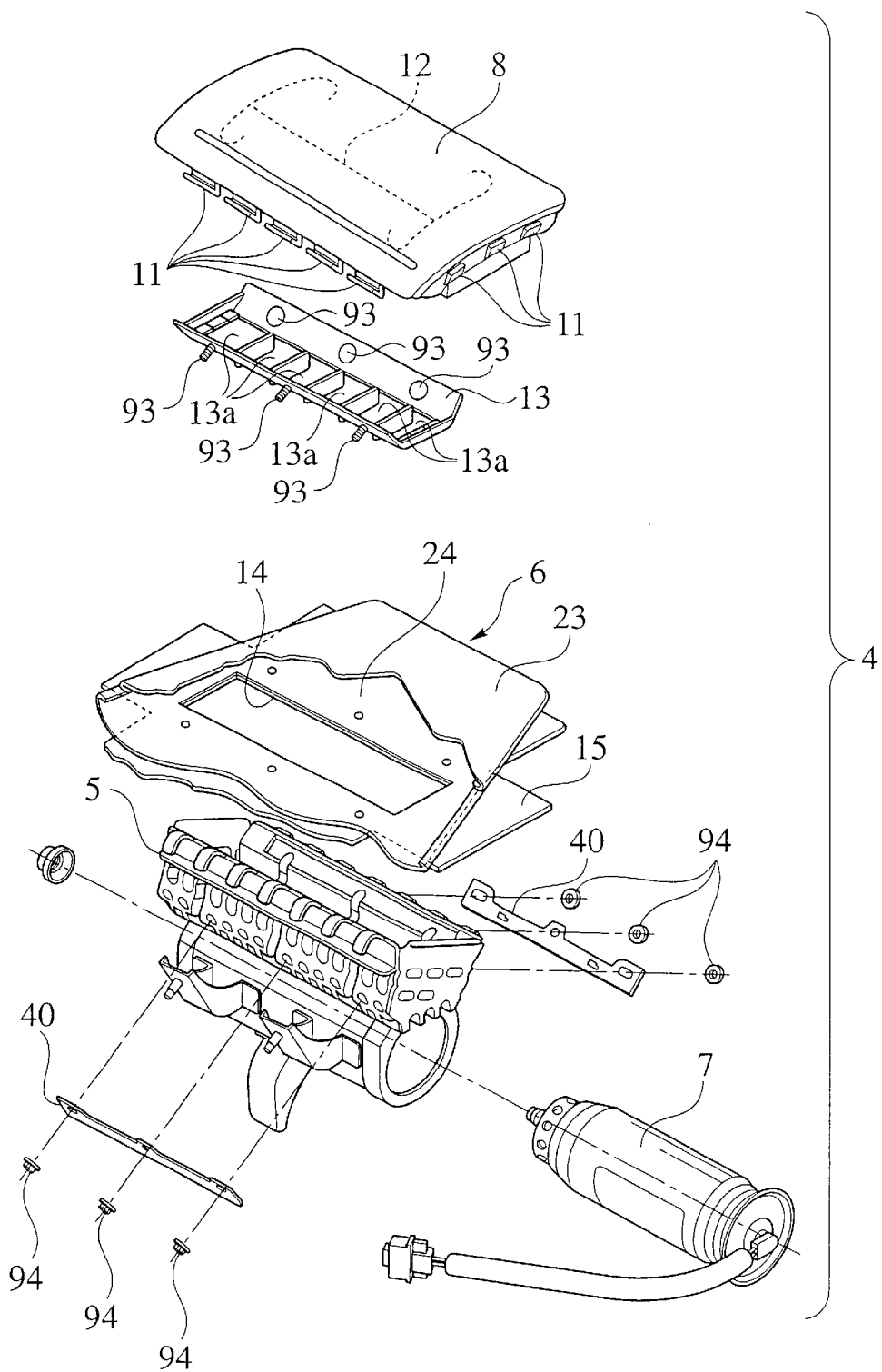
FIG. 2 is an exploded perspective view of an airbag module in the airbag apparatus according to the first embodiment.

As shown in FIG. 1, in an airbag apparatus AB according to this embodiment, a front window panel 2 is disposed above an instrument panel 1 of a vehicle V.

An aperture 3 as an opening is formed on the upper surface of the instrument panel 1, and an airbag module 4 is installed within this aperture 3.

The airbag module 4 chiefly is formed by a case 5, an airbag 6, an inflator 7, and a cover 8.

The case 5 is in the shape of an upwardly opening metal container, and is securely fixed to a reinforcement member (not shown in the drawing) of the instrument panel 1, a hook 9 thereof being engaged by a foot 10 formed on the reverse side of the cover 8. The end part of the cover 8 is placed on the surrounding part of the aperture 3 of the instrument panel 1, and tabs 11 formed on the edge parts of the cover 8 each engages with the edge part of the aperture 3, so as to provide secure stable support without looseness. The upper part of the case 5 is blocked by the cover 8. A bursting part 12 is formed on the reverse surface of the cover 8.

The inflator 7 is housed at the bottommost part of the case 5. The inflator 7 ejects a high-pressure gas in accordance with a signal from a sensor (not shown in the drawing) when a collision occurs or the like. A middle retainer 13 is installed across an intermediate position on the inner surface of the case 5. A plurality of holes 13a are formed on this middle retainer 13, enabling the gas from the inflator 7 to pass therethrough.

The airbag 6 is housed at the top part of the middle retainer 13. The gas guide port 14 of the airbag 6 is disposed between the middle retainer 13 and the inner surface of the case 5, and is fixed in place by a bolt 93 and a nut 94, which serve as holding elements. The reference numeral 40 denotes a retainer plate disposed between the case 5 and the nut 94.

More specifically, the airbag 6 is folded in accordance with a prescribed method for storage. The upper side of the airbag 6 is covered by a pair of covering cloths 15, the end parts of which are grabbed together with the periphery of the gas guide port 14 of the airbag 6.

The airbag 6 is formed as to branch from the gas guide port 14 to a low-capacity sub-expansion part 16 and a high-capacity main expansion part 17, the gas guide port 14 being disposed at the bottom surface side, this being the inflator 7 side of the airbag 6, so that it can supply gas to both the sub-expansion part 16 and the main expansion part 17. It is sufficient that the position of the gas guide port 14 be such that it is possible to impart deployment characteristics, to be described below, to the sub-expansion part 16 and the main expansion part 17.

The sub-expansion part 16 is disposed at the font window panel 2 side, and is stored at the upper side within the case 5, in a condition in which it is folded in two.

Figure 3:
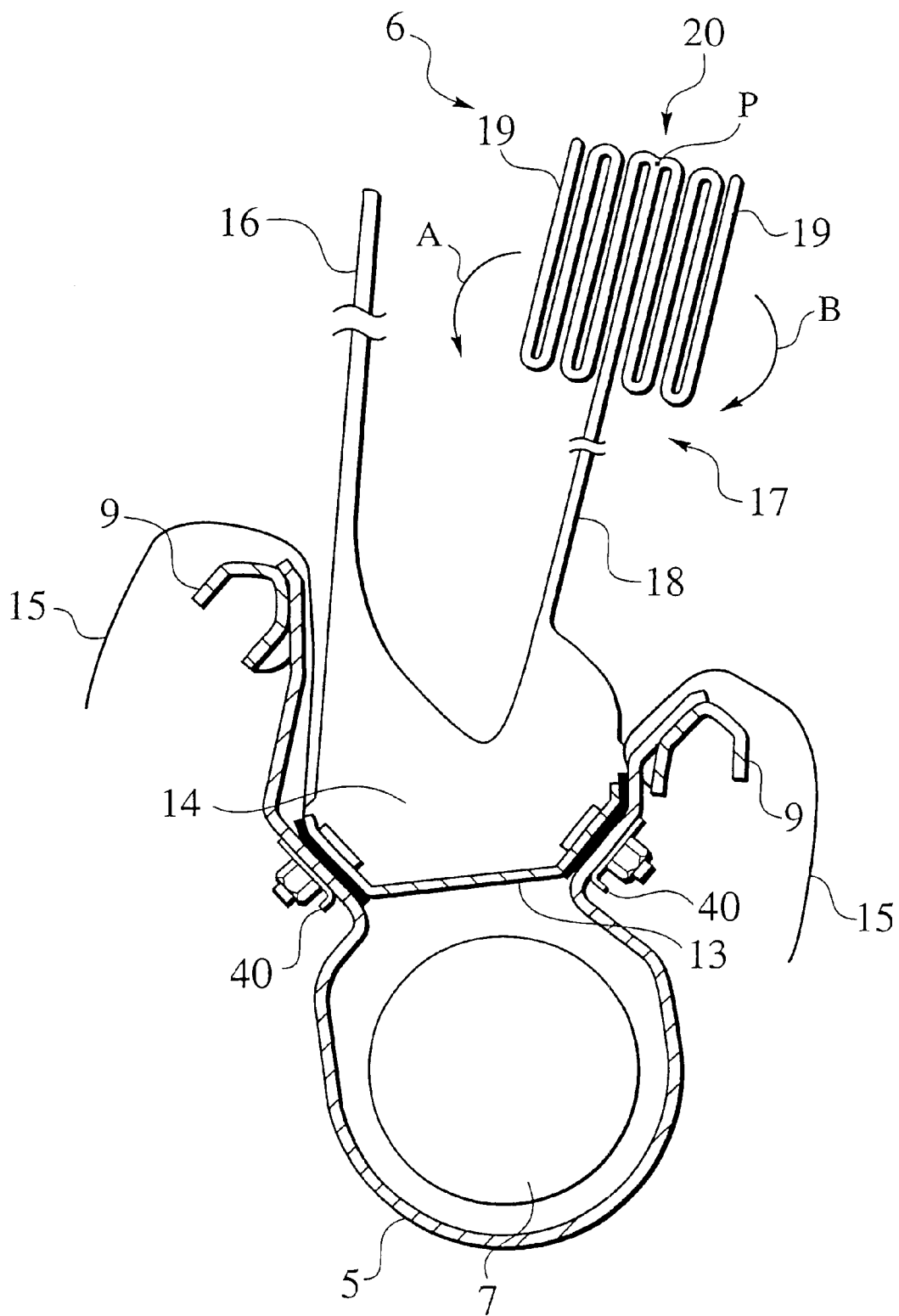
FIG. 3 is a cross-sectional view showing a main expansion part and a sub-expansion part of an airbag of the airbag apparatus according to the first embodiment.

The main expansion part 17 is folded in so as to form a T-shaped bellows shape. This T-shaped bellows, as shown in FIG. 3, refers to the folded condition in which a cylindrical first expansion part 1 that communicates with the gas guide port 14 and a plurality of second expansion parts 19 that are provided so as to extend from a point P on the end side of the first expansion part 18 are collected at a collection part 20 at the side of point P. The T-shaped bellows collection part 20 is rotated in the direction A shown in FIG. 3, the first expansion part 18 being wound around the periphery thereof and stored below the sub-expansion part 16 within the case 5. The direction of rewinding the collection part 20 is direction B, which is the opposite direction from direction A shown in FIG. 3.

Figure 4:
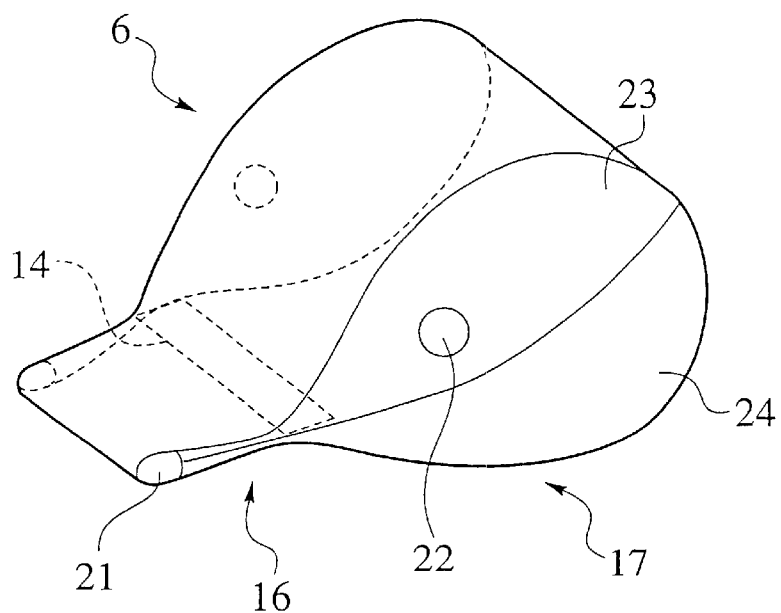
FIG. 4 is a perspective view showing a solid shape of the airbag of the airbag apparatus according to the first embodiment.

The shape of the airbag 6 when it is inflated is shown in FIG. 4.

In the embodiment of the present invention, the gas guide port 14 is typically as shown in FIG. 1, FIG. 3, and FIG. 4, this being displaced from the center on the lower surface of the airbag 6, so that it is displaced toward one side. That is, the side from which the distance to the gas guide port 14 is shorter is the sub-expansion part 16, and the side from which the distance to the gas guide port 14 is longer is the main expansion part 17. Thus, the distance between the gas guide port 14 and the sub-expansion part 16, is established as being shorter than the distance between the gas guide port 14 and the main expansion part 17. Vent holes 21 and 22 are respectively formed in the end part of the sub-expansion part 16 and the upper side part of the main expansion part 17. The vent holes 21 and 22 in this embodiment have a construction as described later, whereby the internal pressure within the airbag 16 is reduced to some degree, thereby reducing the need to provide them with strong reinforcement.

Figure 5:
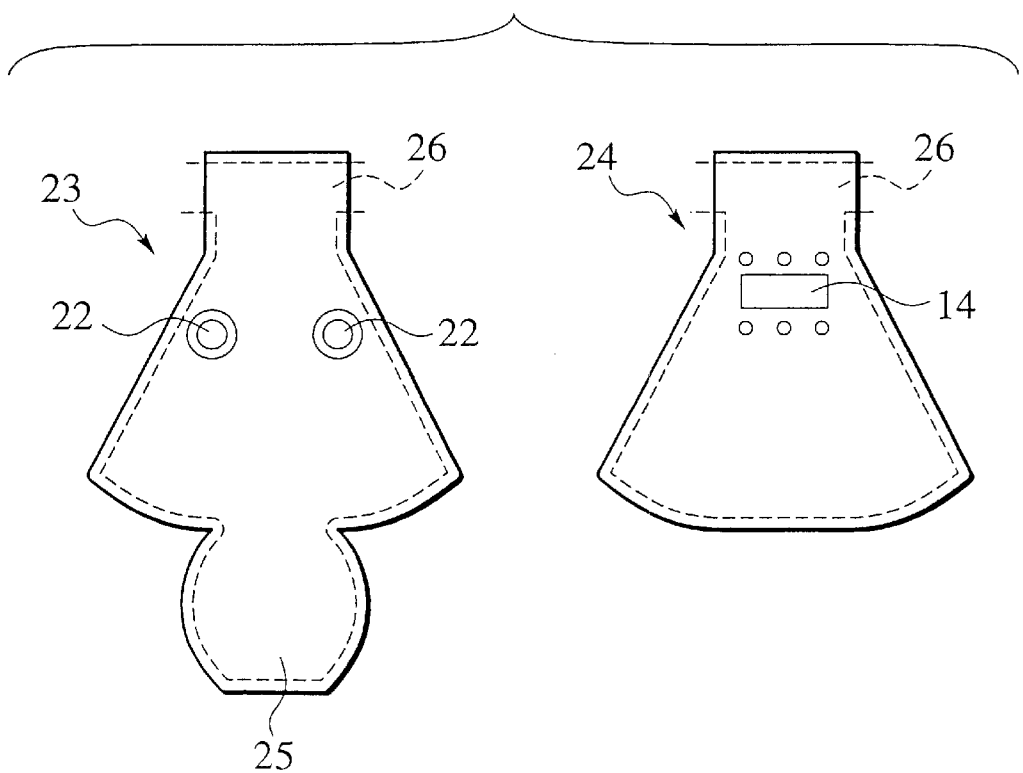
FIG. 5 includes plan views showing two layers of cloth that make up the airbag of the airbag apparatus according to the first embodiment.

As shown in FIG. 5, the airbag 6 is formed using two layers of base cloth, an upper cloth 23 and a lower cloth 24. Both the upper cloth 23 and the lower cloth 24 are basically fan-shaped, with one side of each being slightly elongated, so as to form the sub-expansion part 16. A pair of vent holes 22 are formed in the upper cloth 23. An extended part 25 that forms a surface that receives the passenger is integrally formed on the other side of the upper cloth 23

The airbag 6 is formed by sewing together the edges of upper cloth 23 and the lower cloth 24 along the broken line. A non-sewn part 26 is provided in the end parts of the sub-expansion part 16 of the upper cloth 23 and the lower cloth 24 have formed in them through holes so as to form the vent holes 21.

Thus, the airbag 6 of this embodiment is formed by the upper cloth 23 and the lower cloth 24, thereby facilitating manufacturing.

Next, the actual deployment behavior of an airbag 6 in the airbag apparatus AB in this embodiment is described below, with reference made to FIG. 6 to FIG. 9.

Figure 6:
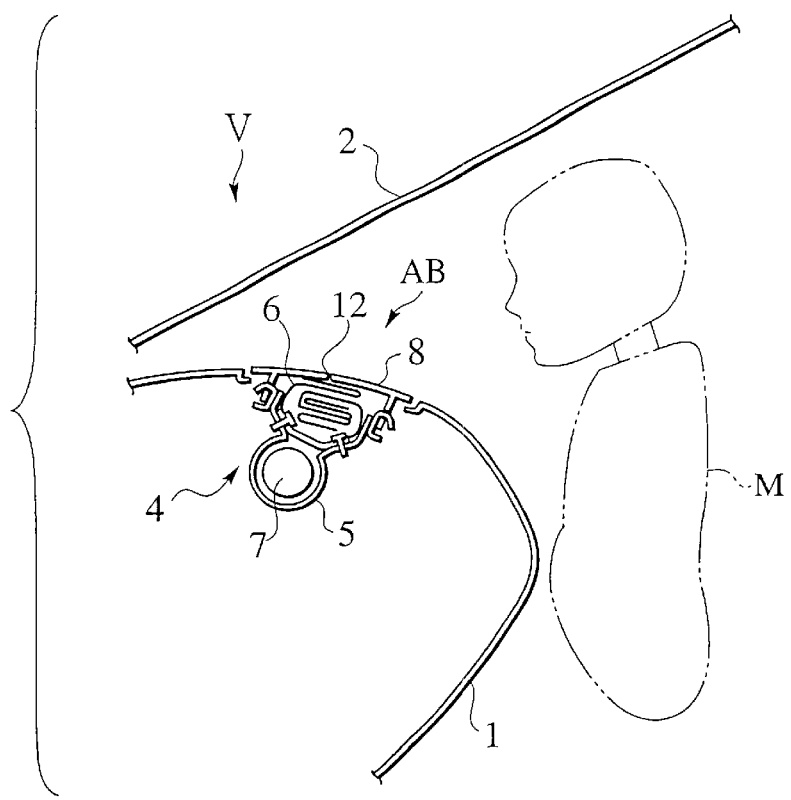
FIG. 6 is a cross-sectional view showing a non-opened condition of the airbag of the airbag apparatus according to the first embodiment.

FIG. 6 shows the condition in which a passenger M approaches the instrument panel 1.

In this embodiment, when the vehicle experiences a collision or the like, causing a sudden deceleration, gas is ejected into the airbag 6 from the inflator 7. Because the gas ejected into the airbag 6 has nowhere to go before the cover 8 bursts open, there is sufficient increase of the pressure within the main expansion part 17 an the sub-expansion part 16 within the airbag module 4, this reaching a pressure high enough to burst open the cover 8.

Figure 7:
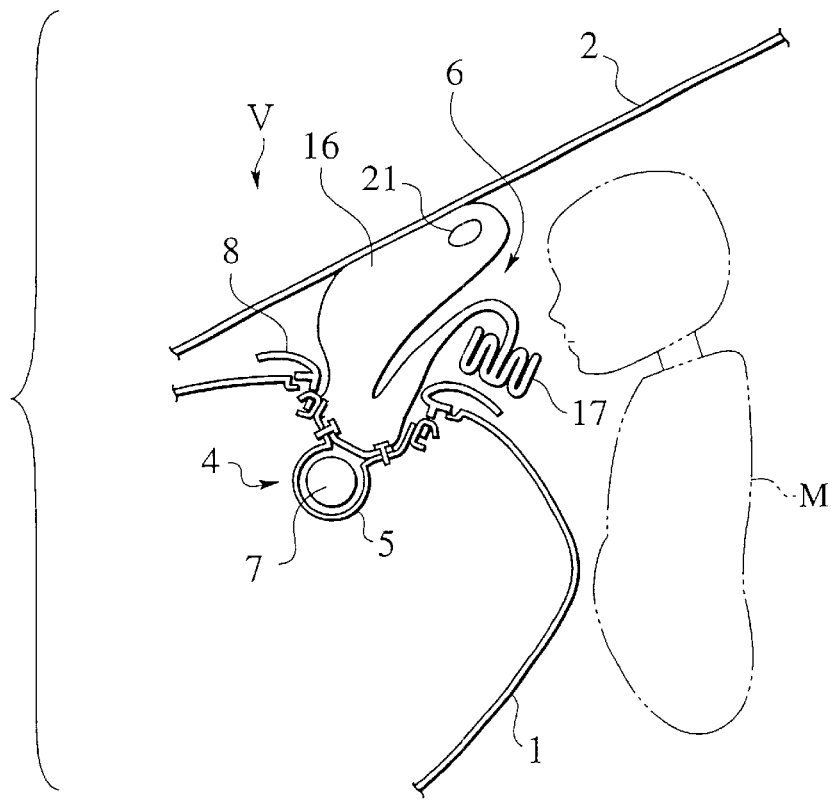
FIG. 7 is a cross-sectional view showing an initial opened condition of the airbag of the airbag apparatus according to the first embodiment.

When this condition is reached, as shown in FIG. 7, the cover 8 bursts open at the bursting part 12. When this occurs, the small-capacity sub-expansion part 16 deploys before the main expansion part 17. At the instant that the cover 8 bursts open in this manner, if the sub-expansion part 16 deploys first, the internal pressure in the airbag 6 is decreased by the amount of gas that was used to deploy the sub-expansion part 16, thereby achieving a proper adjustment of the pressure within the airbag 6. Then, when the sub-expansion part 16 becomes fully expanded, the internal gas escapes from the vent holes 21, thereby achieving a good cutoff of the internal gas pressure in the airbag 6 at the so-called first peak.

Then, after the sub-expansion part 16 expands fully, the folded-up condition that the main expansion part 17 was in during the expansion of the sub-expansion part 16 is gradually released, so that the gas flows into the main expansion part 17, which is at a low pressure. When this occurs, first the first expansion part 18 of the main expansion part 17 first deploys, so that the collection part 20 of second deployment part 19 of the main expansion part 17 rushes outside of the airbag module 4 bundled together.

Figure 8:
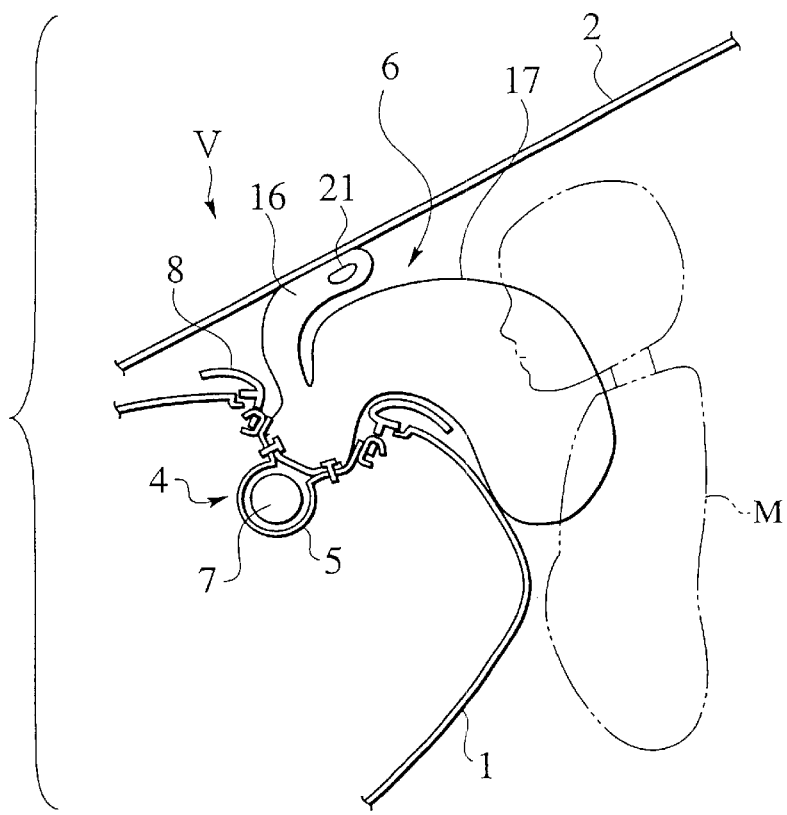
FIG. 8 is a cross-sectional view of a condition in which the main expansion part of the airbag of the airbag apparatus according to the first embodiment starts to expand.

When the main expansion part 17 starts to expand in this manner, as shown in FIG. 8, the sub-expansion part 16 is subjected to negative pressure, causing it to start to collapse. When this occurs, however, the sub-expansion part 16, which had expanded first toward the front window 2, acts to press the sub-expansion part 17, which expanded later, toward the passenger M.

Figure 9:
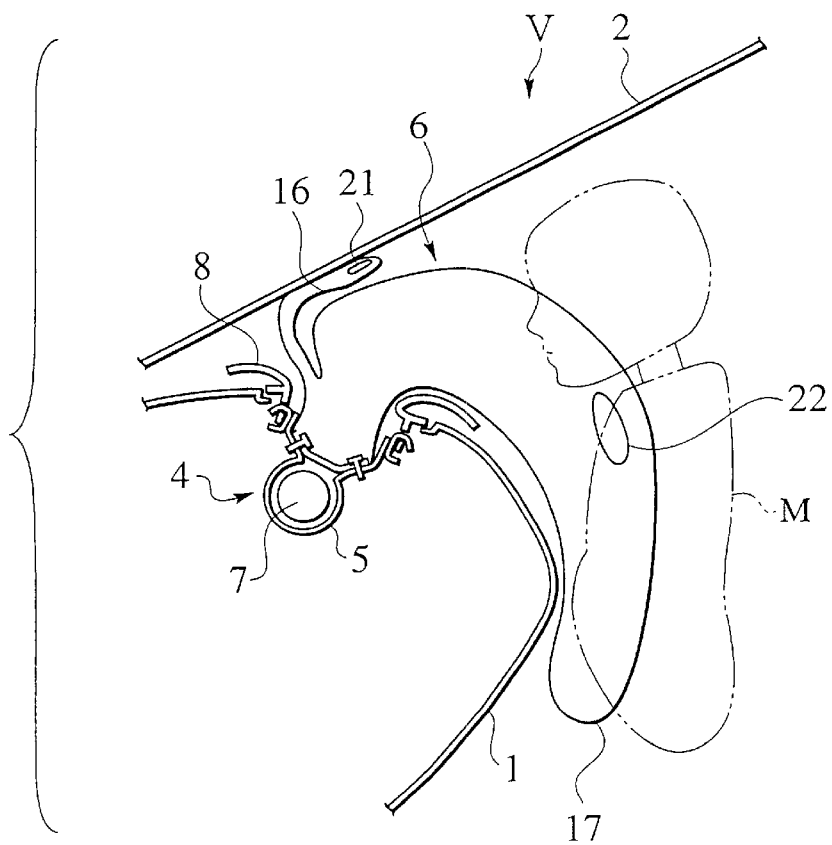
FIG. 9 is a cross-sectional view showing a condition in which the main expansion part of the airbag of the airbag apparatus according to the first embodiment is extended downward along a surface of an instrument panel.

Next, as shown in FIG. 9, the main expansion part that expanded later receives pressure from the sub-expansion part 16 so as to direct it toward the passenger M, thereby deploying sufficiently downward along the surface of the instrument panel 1. Simultaneously with this action, the take-up of the collection part 20 of the airbag 6 in the B direction, that is, its rewind in the B direction, shown in FIG. 3 also acts to encourage the deployment of the airbag 6 so as that the main expansion part 17 to extend downward along the surface of the instrument panel 1. That is, because the collection part 20 is taken up so that it rolls along the surface of the instrument panel 1, the airbag 6 tends to extend downward along the surface of the instrument panel 1, that it can easily come between the passenger M and the instrument panel 1.

When the main expansion part 17 expands so as to extend downward, exhausting of gas from the vent hole 22 occurs, thereby stopping the action of expanding the airbag 6.

In an embodiment of the present invention such as described above, at the stage before the airbag bursts the cover open, there is sufficient increase in the pressure inside both the main expansion part and the sub-expansion part, so that a pressure sufficient to burst the cover open develops, thereby enabling reliable bursting open of the cover by the airbag.

Because the small-capacity sub-expansion part deploys first, the pressure within the airbag is decreased by the amount of air used to provide initial expansion of the sub-expansion part, thereby achieving proper adjustment of the air pressure within the airbag.

Because sub-expansion part that has extended at the front window panel side acts to press the main expansion part that deploys later toward the passenger, it is easy for the main expansion part to sufficiently extend downward along the surface of the instrument panel.

Because the deployment of the first deployment part of the main expansion part causes the collection part of the second deployment part to fly to a large space outside the airbag module, it is possible with even a relatively small pressure to cause quick deployment of the entire main expansion part.

Because the collection part is taken up downward along the surface of the instrument panel, the main expansion part deploys sufficiently downward, and is easily brought to between the passenger and the instrument panel.

Because the airbag is formed from two layers of cloth, the manufacture of the airbag is facilitated.

Additionally, because of the vent holes formed in the main expansion part, the function of lowering the pressure within the airbag is enhanced. These vent holes are provided on parts other than the parts that receive the passenger, thereby reducing the chance that they will be blocked by contact with a passenger. By causing the sub-expansion part to deploy first, so that the internal pressure is appropriately lowered, the need to provide strong reinforcement for the vent holes formed in the main expansion part is reduced.

While in this embodiment of the present invention as described above, in the collection part of the airbag, the configuration is such that gas ejected from the inflator is uniformly guided in to each second deployment part, it will be understood that, depending upon the desired function, it is also possible to provide three or more second deployment parts. Additionally, it is alternately possible to have either only a first deployment part that can deploy only in the A direction or only a second deployment part that can deploy only in the B direction, in which case it is possible to achieve compactness in the overall airbag 6.

A second embodiment of an airbag apparatus for a vehicle according to the present invention is described below, with reference made to FIG. 10.

In this embodiment of an airbag apparatus according to the present invention, the basic configuration is the same as that of the first embodiment, and corresponding elements have been assigned the same reference numerals, and will not be described in detail herein.

Figure 10:
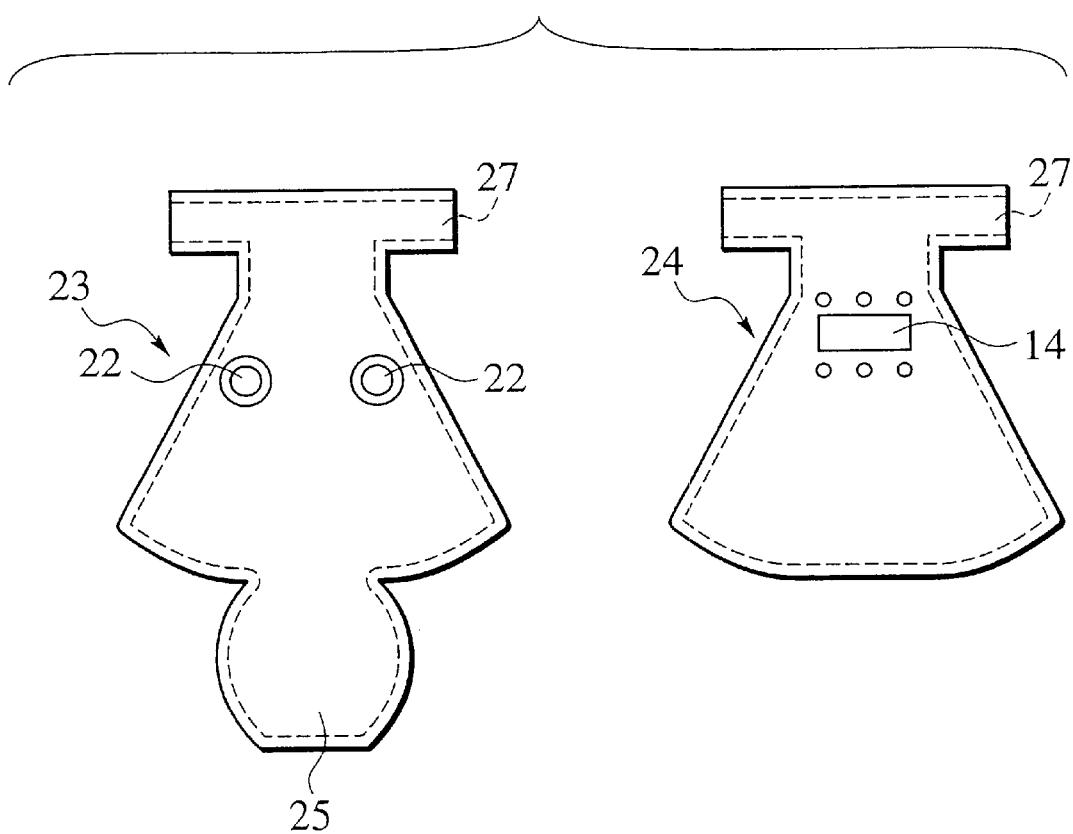
FIG. 10 includes plan views showing two layers of cloth that make up an airbag apparatus according to the second embodiment of the present invention.

In this embodiment as well, as shown in FIG. 10, the airbag is formed using two base cloths, the upper cloth 23 and the lower cloth 24. Both the upper cloth 23 and the lower cloth 24 have on one end of each a slight elongation so as to form the sub-expansion part 16.

However, the vent holes 27 of the sub-expansion part are formed as ducts, by extending each end of the sub-expansion parts 16 of the upper cloth 23 and lower cloth 24 so as to be a T-shape and sewing these parts together along the broken line.

In this embodiment, therefore, because the airbag is formed the two layer of cloth of the upper cloth 23 and the lower cloth 24, in addition to facilitating the manufacturing thereof, by forming the vent holes 27 as ducts, strength is increased and there is resistance to tearing when the airbag deploys, thereby increasing the reliability of deployment.

A third embodiment of an airbag apparatus for a vehicle according to the present invention is described below, with references being made to FIG. 11 to FIG. 20.

In this embodiment of an airbag apparatus as well, the basic configuration is the same as that of the first embodiment, with corresponding elements assigned the same reference numerals and not explained in detail herein.

In this embodiment as well, a front window panel 2 is disposed above an instrument panel 1 of the vehicle V, an aperture 3 being formed on the upper surface of the instrument panel 1, and an airbag module 4 being installed within this aperture 3.

The airbag module 4 is chiefly made up of a case 5, an airbag 106, an inflator 7, and a cover 8, the airbag 106 being housed above a middle retainer 13 having formed in it a plurality of holes 13a being similar to the case of the first embodiment.

In the third embodiment, however, the airbag 106 branches from a gas guide port 114 into a small-capacity sub-expansion part 116 that is short and narrow, and a large-capacity main expansion part 17 that is long and wide. The main expansion part 117 of the airbag 106 is folded for storage into a wave-shaped bellows shape. The upper side of the airbag 106 is covered by a pair of covering cloths 15, the end parts of which are grabbed together with the gas guide port 114 of the airbag 106.

Figure 11:
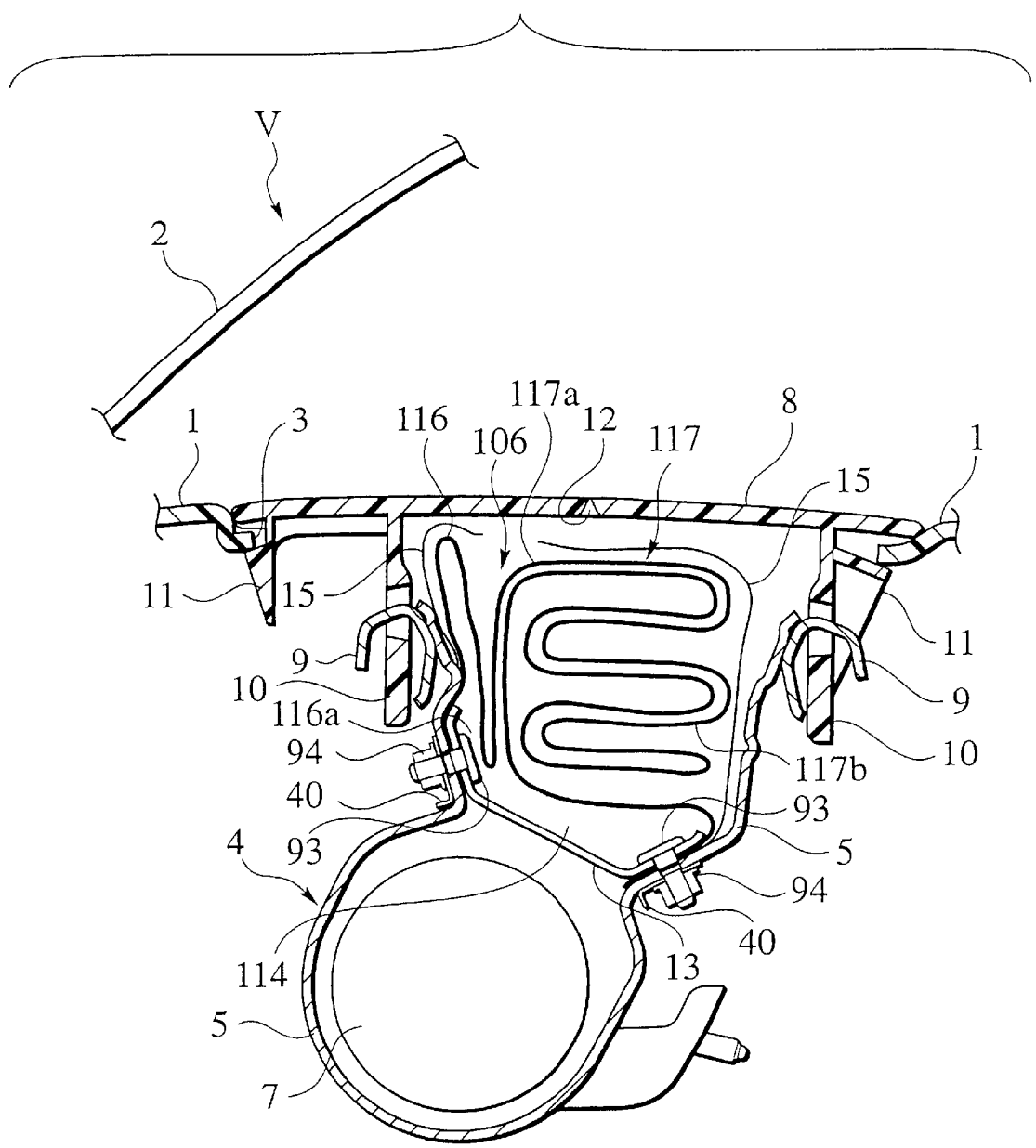
FIG. 11 is a cross-sectional view showing an airbag apparatus according to the third embodiment of the present invention.

The sub-expansion part 116 of the airbag 106, as shown in FIG. 11, is disposed on the side of the front window panel 2, in substantially an upright attitude, housed at the front inside part of the case 5. The sub-expansion part 116 has a gas guide port 116a that communicate's with the gas guide port 114, the gas guide port 116a of the sub-expansion part 116 is set so as to be open at all times by a bolt 93 and a nut 94 that serve as fixing elements to fix the airbag 106 to the case 5.

Figure 14:
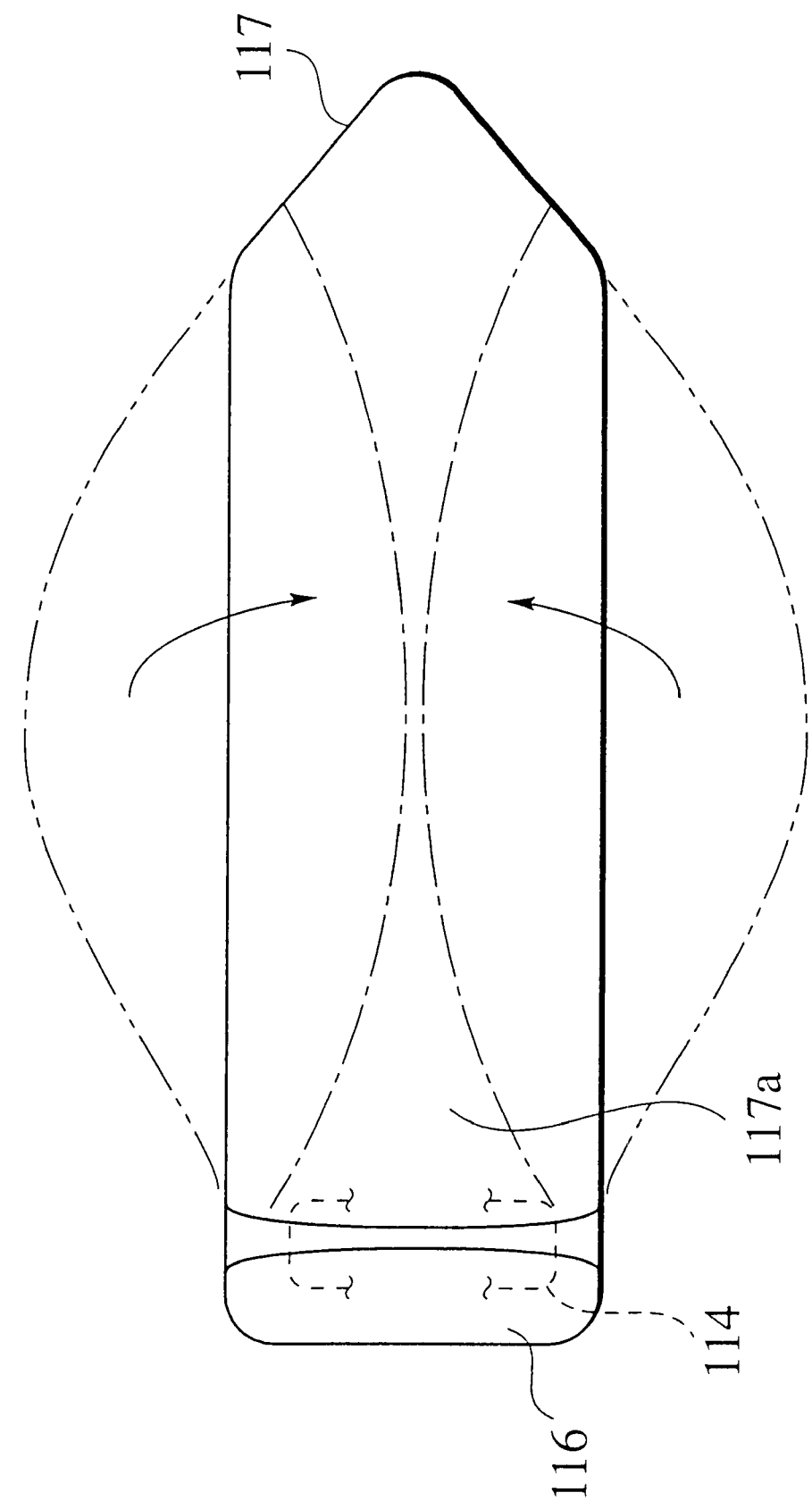
FIG. 14 is the plan view showing the airbag of the airbag apparatus according to the third embodiment.
Figure 15:
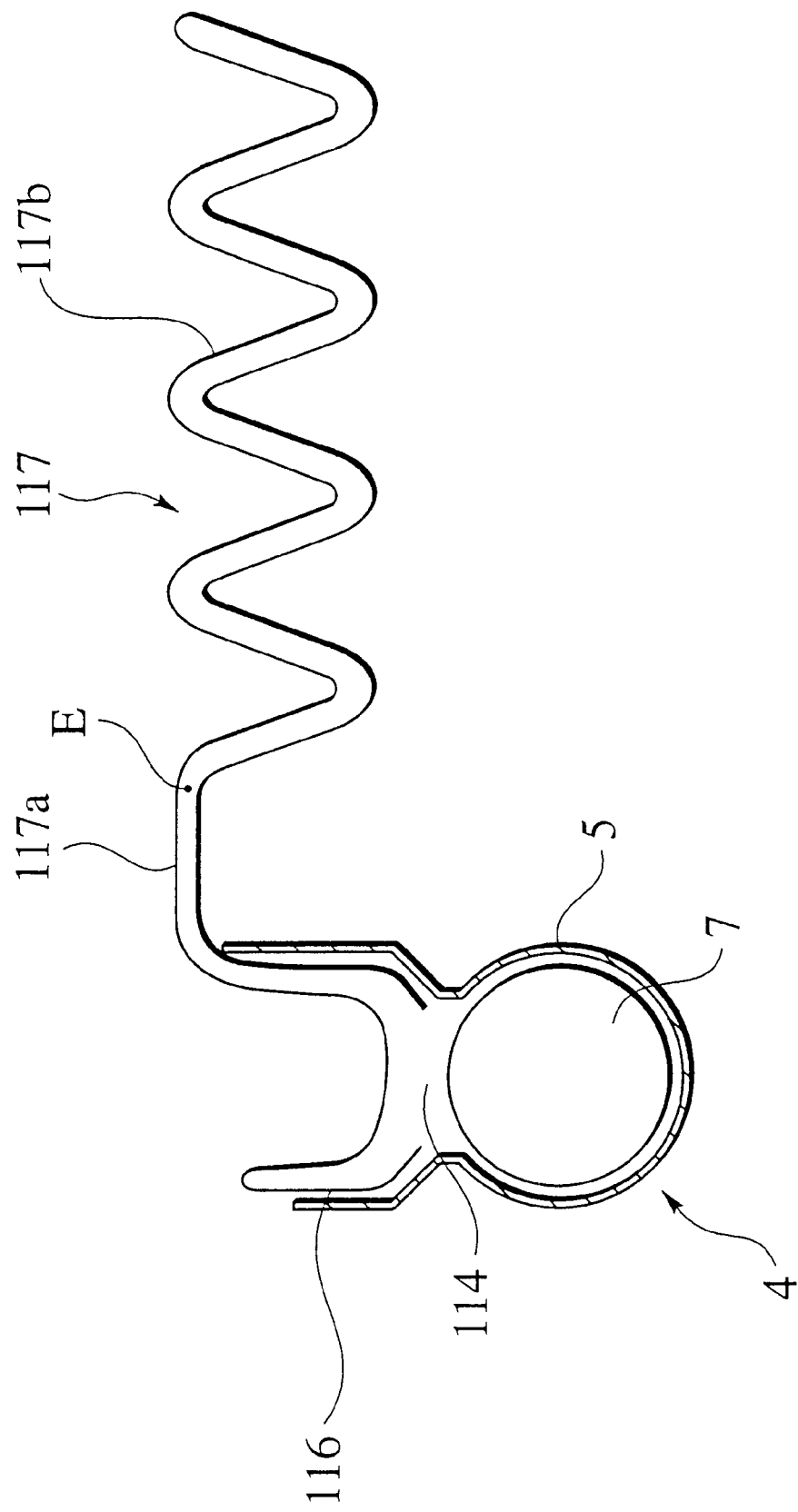
FIG. 15 is a cross-sectional view showing the airbag of the airbag apparatus according to the third embodiment.
Figure 16:
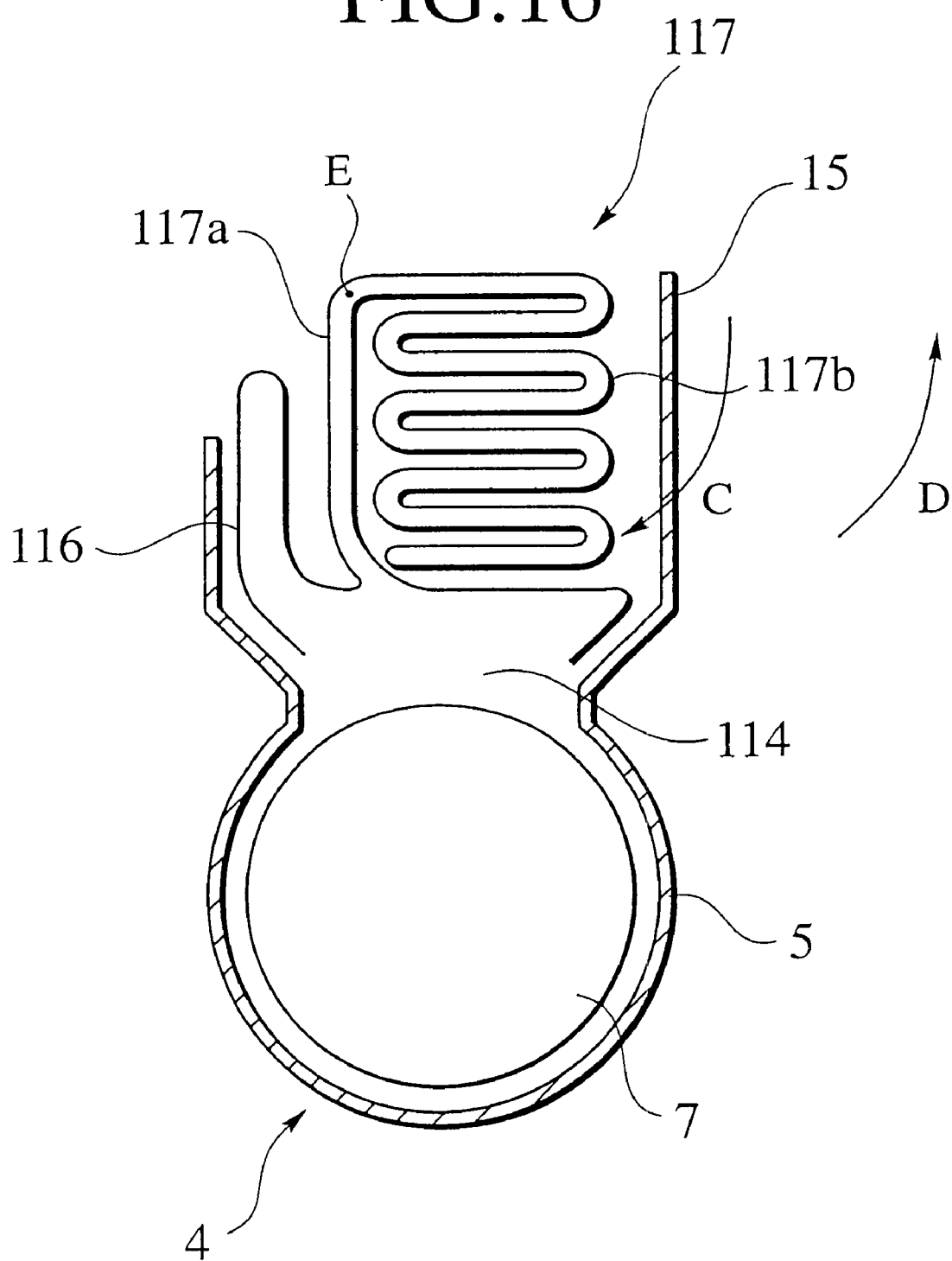
FIG. 16 is a cross-sectional view showing a stored condition of the airbag of the airbag apparatus according to the third embodiment.

The process of folding up the airbag 106 is as follows. First, as shown in FIG. 14, the initial edge of the main expansion part 117 indicated by the double-dot-dashed line is folded over to the position indicated by the single-dot-dashed line, so as to form the straight part 117a. In this condition, as shown in FIG. 15, a bellows part 117b is formed by making a plurality of folds in the part that is closer to the end than some prescribed point E on the cylindrical straight part 117a that communicates with the gas guide port 114. Additionally, as shown in FIG. 16, the bellows part 117b formed by a plurality of folds extending from the prescribed point E of the straight part 117a is rotated in the C direction with respect to the straight part 117a as it is folded along the straight part 117a. This is the condition in which, in this embodiment, the main expansion part 117 is folded into a bellows shape. The direction of take-up of the bellows part 117b is the direction D, which is opposite from the direction C.

Figure 12:
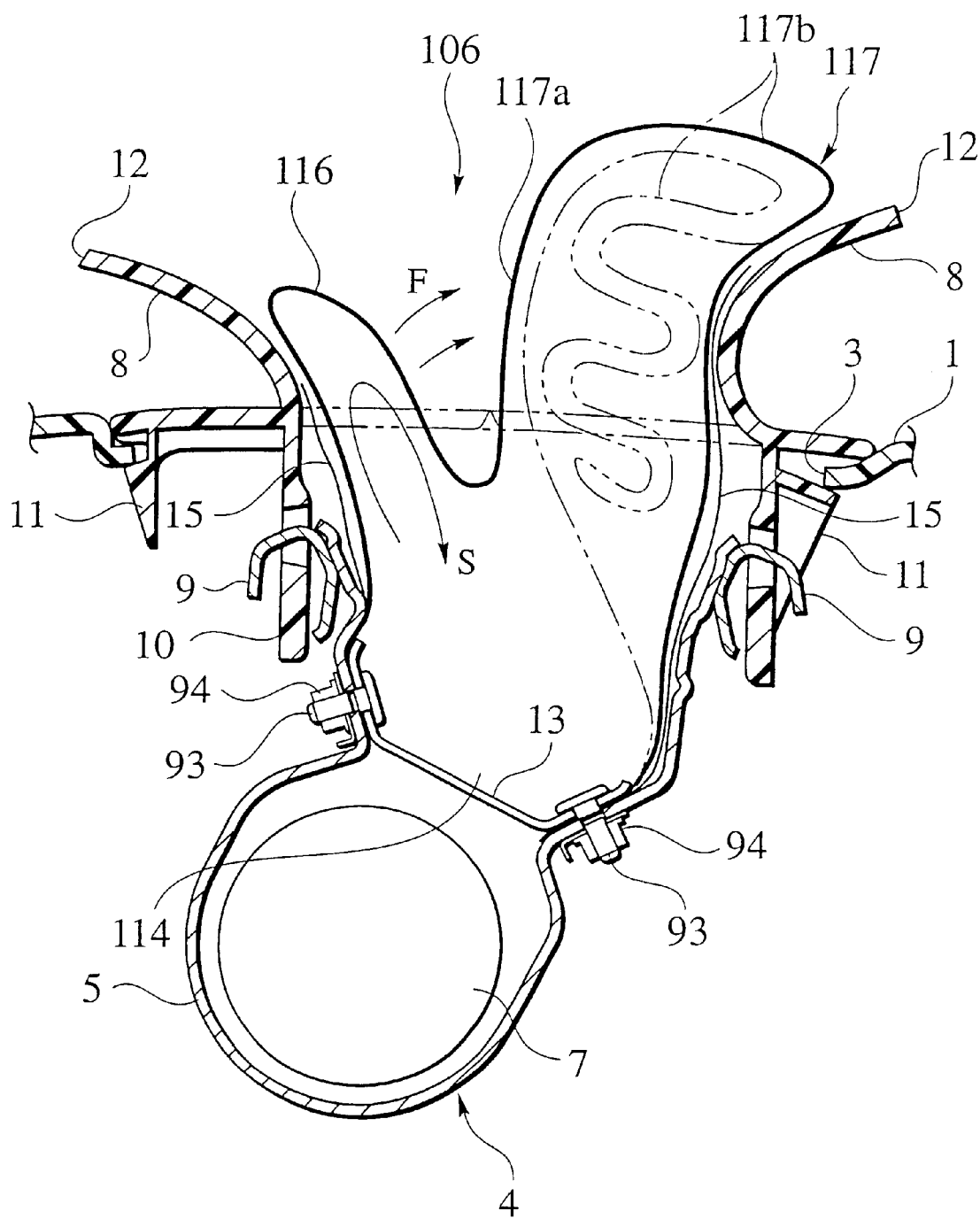
FIG. 12 is a cross-sectional view showing an expanded conditions of a main expansion part and a sub-expansion part of the airbag of the airbag apparatus according to the third embodiment.

The condition in which the airbag 106 bursts the cover 8 open and its process of expanding is shown in FIG. 12, which shows the action of a gas flow S in the sub-expansion part 116 applying a force F to the main-expansion part 117.

The position of the gas guide port 114 in this embodiment on the lower surface of the airbag 106, compared to the first embodiment, is displaced toward the main expansion part 117, so that the distance between the sub-expansion part 116 and the gas guide port 114 is made longer than the distance between the main expansion part 117 an the gas guide port 114.

Figure 13:
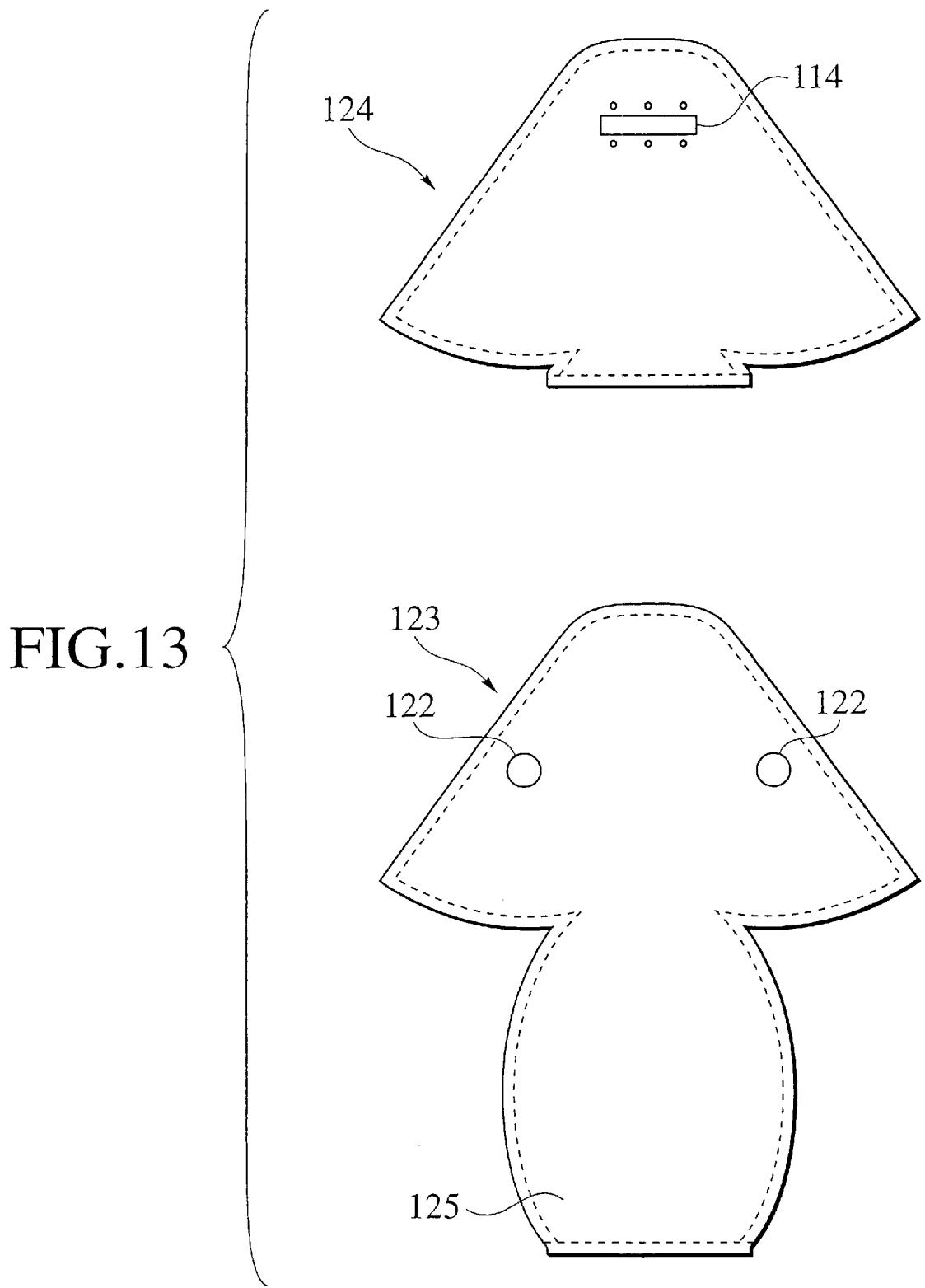
FIG. 13 includes plan views showing two layers of cloth that make up the airbag of the airbag apparatus according to the third embodiment.

The airbag 106, similar to the case of the first embodiment and as shown in FIG. 13, is formed by two base cloths, an upper cloth 123 and a lower cloth 124. Both the upper cloth 123 and the lower cloth 124 are fan-shaped, and one side of each is slightly elongated, so as to form the sub-expansion part 116.

An extended part 125 that forms a surface that receives the passenger is integrally formed on the other side of the upper cloth 123.

Additionally, a pair of vent holes 122 are formed on the upper cloth 123, these vent holes 122, by means of a structure to be described below, provide an appropriate lowering of the internal pressure in the airbag 106, thereby reducing the need to provide strong, reinforcement. The vent holes 122 are provided in parts other than the parts that receive the passenger.

In this embodiment, however, there are no vent holes provided in the upper cloth 123 and the lower cloth 124 by means of unsewn parts.

By sewing the edge parts of the upper cloth 123 and lower cloth 124 along the broken line, the airbag 106 is formed, and the manufacture of the airbag 106 of this embodiment as well is facilitated by forming it from two layers, the upper cloth 123 and the lower cloth 124.

Next, referring to FIG. 12 and to FIG. 17 through FIG. 20, the action of deployment of the,airbag 106 in the airbag apparatus AB of this embodiment will be described.

Figure 17:
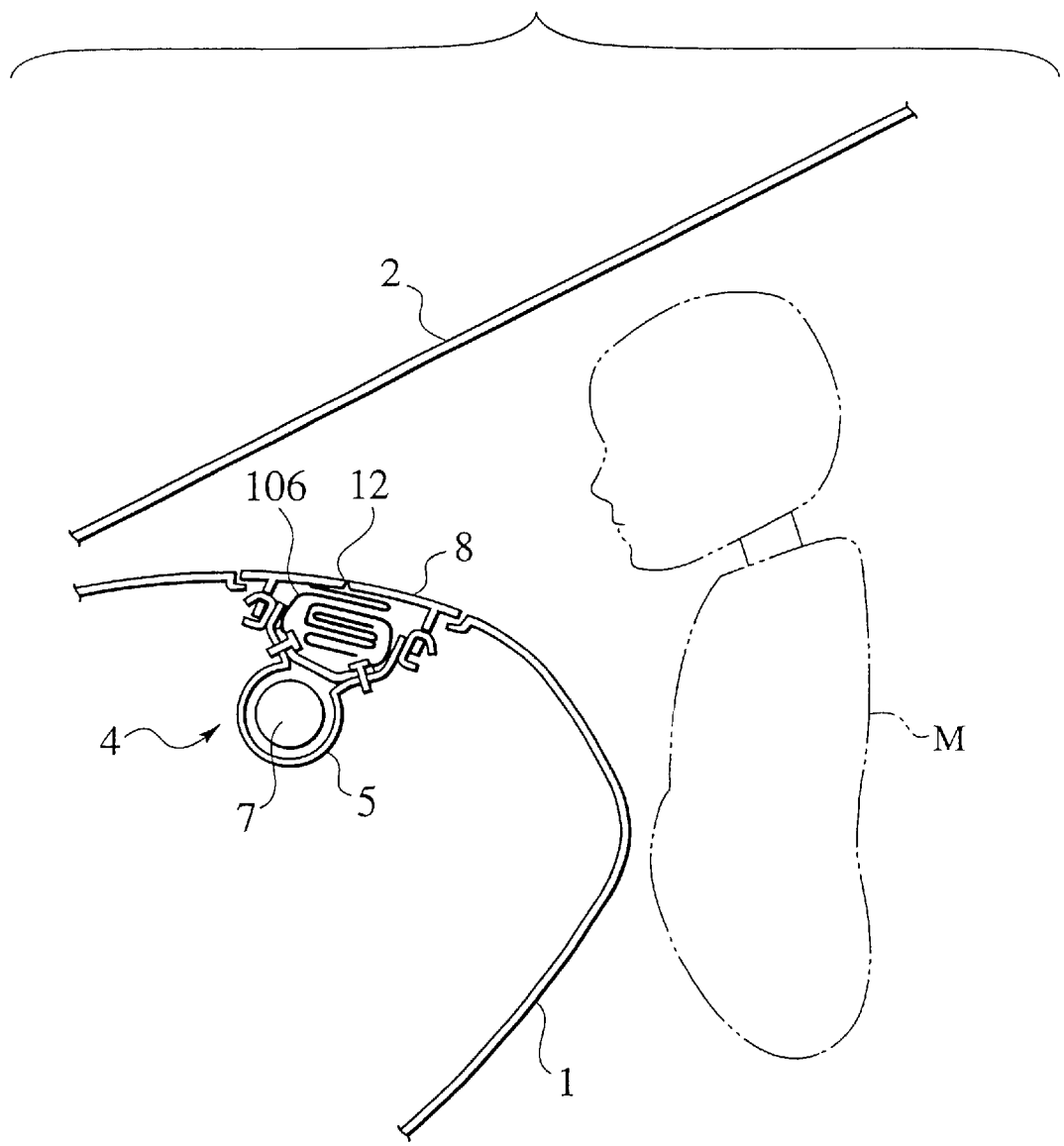
FIG. 17 is a cross-sectional view showing a non-opened condition of the airbag of the airbag apparatus according to the third embodiment.

FIG. 17 shows the condition in which a passenger M approaches the instrument panel 1.

In this condition, when the vehicle V experiences a collision or the like, causing a sudden deceleration, gas is ejected into the airbag 106 from the inflator 7. Although the gas ejected into the airbag 106 has nowhere to go toward the outside of the cover 8 before the cover 8 bursts open, because the gas guide port 116a side of the sub-expansion part 116 is open at all times, the gas first enters the sub-expansion part 116, so that the pressure inside the sub-expansion part 116 in the airbag module 4 rises sufficiently, as the pressure in the main expansion part 117 as well reaches an appropriate internal pressure within the airbag module 4, this reaching a pressure sufficient to burst the cover 8 open.

When the above-noted condition is reached, as shown in FIG. 12, the cover 8 bursts open from the bursting part 12, at which point first the small-capacity sub-expansion part 116 deploys. However, at the instant the cover 8 burst open, the sub-expansion part 116 deploys to a degree that dose not cause it to reach the front window panel 2. At this point, the pressure in the airbag 106 is decreased by the amount of gas used to deploy the sub-expansion part 116, thereby achieving a proper adjustment of the internal pressure therewithin.

Figure 18:
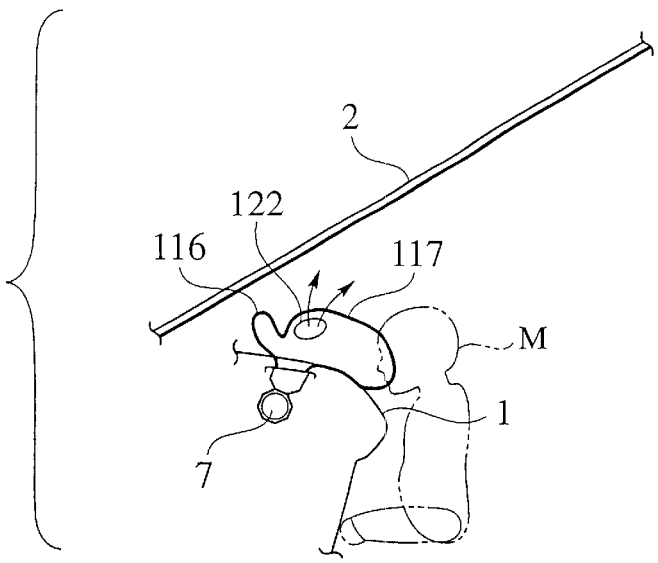
FIG. 18 is a cross-sectional view showing the condition in which a main expansion part of the airbag of the airbag apparatus according to the third embodiment is initially extended downward along a surface of an instrument panel.
Figure 19:
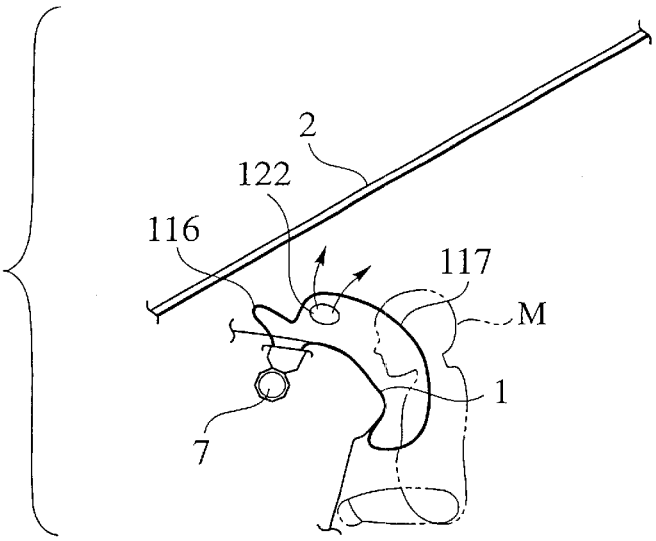
FIG. 19 is a cross-sectional view showing the condition in which the main expansion part of the airbag of the airbag apparatus according to the third embodiment is further extended downward along the surface of the instrument panel.

Next, as shown in FIG. 18, when the sub-expansion part 116 expands fully, during which time the folds of the main expansion part 117 are undone, the gas flows toward the low-pressure side, which is the main expansion part 117. First, the straight part 117a of the main expansion part 117 deploys, so that the bellows part 117b rushes to the outside of the airbag module 4 in a bundled condition. By the bellows part 117b rushing outside the airbag module 4 in this manner in a bundled condition, it is possible to deploy the entire main expansion part quickly, using a relatively small pressure. The sub-expansion part 116 that had previously deployed starts to expand so as to extend downward along the surface of the instrument panel 1 as it pressed against the passenger M, and the gas starts to be appropriately exhausted from the vent holes 122. At this point, the take-up of the bellows parts 117b of the main expansion part 117 in the B direction also acts to encourage the deployment of the main expansion part 117 downward along the surface of the instrument panel 1. That is, because the bellows part 117b is taken up in a direction that causes it to roll down along the surface of the instrument panel 1, it extends downward and easily enters the space between the passenger M and the instrument panel 1.

Figure 20:
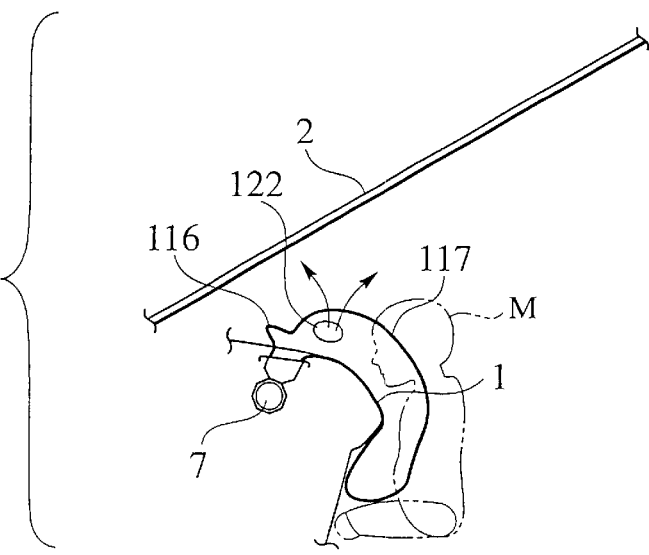
FIG. 20 is a cross-sectional view showing the condition in which the main expansion part of the airbag of the airbag apparatus according to the third embodiment is substantially completely extended downward along the surface of the instrument panel.

Next, referring to FIG. 19l and FIG. 20, the main expansion part 117, by the action of the sub-expansion part 116 that had earlier deployed, and the action of the take-up of the bellows part 117b of the main expansion part 117, expands further so as to extend downward along the surface of the instrument panel 1, between the instrument panel 1 and the passenger M. Because the pressure applied to the sub-expansion part 116 is removed, the sub-expansion part 116 is subjected to negative pressure, which causes it to collapse.

When the main expansion part 117 has fully expanded downward, because the exhaust of gas from the vent holes 122 continues, the main expansion part 117 also shrivels up, thereby completing the deployment action of the airbag 106.

In the above-noted embodiment as well, at the stage before the bursting open of the cover by the airbag, there is sufficient increase in the internal pressure of both the sub-expansion part and the main expansion part within the airbag module, this reaching a high pressure sufficient to burst the cover, so that the cover is burst open reliably.

Because the small-capacity sub-expansion part deploys first, the pressure within the airbag is decreased by the amount of air used to provide initial expansion of the sub-expansion part, thereby achieving proper adjustment of the air pressure within the airbag.

Additionally, while the sub-expansion part that deploys toward the front window panel does not itself reach the front window panel, because it has the action of pressing the main expansion part that deploys thereafter toward the passenger, the main expansion part easily deploys so as to extend downward along the surface of the instrument panel.

Because the bellows part of the main expansion part deploys after the sub-expansion part so as to fly to a large space outside the airbag module, it is possible to quickly deploy the entire main expansion part with even a relatively small pressure.

Because the bellows part of the main expansion part is taken up downward along the surface of the instrument panel, it deploys sufficiently downward, and is easily brought to be in between the passenger and the instrument panel.

Because the airbag is formed from two layers of cloth, the manufacture of the airbag is facilitated.

Additionally, because of the vent holes formed in the main expansion part, the function of lowering the pressure within the airbag is enhanced. These vent holes are provided on parts other than the parts that receive the passenger, thereby reducing the chance that they will be blocked by contact with a passenger. By causing the sub-expansion part to deploy first, so that the internal pressure is appropriately lowered, the need to provide strong reinforcement for the vent holes formed in the main expansion part is reduced.

Additionally, because a fixing member is used to keep the gas guide port of the sub-expansion part open at all times, gas ejected from the inflator is guided quickly, not into the closed main expansion part, but rather into the open sub-expansion part, thereby reliably accelerating the inflation of the sub-expansion part.

Additionally, because this embodiment is configured so that the sub-expansion part does not reach the instrument panel, the main expansion part being formed so as to have a simple bellows part, it is possible to achieve a simple, compact airbag apparatus with improved manufacturability.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An airbag apparatus for a vehicle, comprising:
   a case having an opening blocked by a cover capable of being burst open;
   an airbag having a gas guide port and disposed within the case; and
   an inflator operative to eject gas through the gas guide port into the airbag disposed inside the case, thereby causing the airbag to expand within the case and burst open the cover so that the airbag deploys inside the vehicle;
   wherein the airbag branches from the gas guide port to a sub-expansion part having a small capacity and to a main expansion part having a relatively large capacity, the sub-expansion part being disposed at a side of a front window panel positioned at a front portion of a passenger compartment of the vehicle, and the main expansion part being folded up and disposed at a side of a passenger in the passenger compartment of the vehicle the sub-expansion part having a portion juxtaposing with the main expansion part;
   wherein a gas guide port for the sub-expansion part is kept open by a fixing member fixing the airbag to the case so as to introduce the gas ejected from the inflator first ito the portion of the sub-expansion part juxtaposing with the main expansion part while the main expansion part remains folded-up, thereby deploying the sub-expansion part along a direction in which the gas is ejected before the main expansion part is unfolded in response to the ejected gas; and
   wherein a vent hole is formed in a position of the main expansion part other than a position which receives a passenger in the passenger compartment.

2. An airbag apparatus according to claim 1, wherein an airbag module is formed by housing the airbag and the inflator within the case.

3. An airbag apparatus according to claim 2, wherein the airbag module is installed within an instrument panel positioned below the front window panel.

4. An airbag apparatus according to claim 1, wherein the main expansion part comprises a first expansion part communicating with the gas guide port and a collection part that collects a second expansion part at a prescribed point, the second expansion part extending from the prescribed point positioned at an end side of the first expansion part.

5. An airbag apparatus according to claim 4, wherein the first expansion part of the main expansion part is wound around the periphery of the collection part thereof so that the collection part is rewound downward along a surface of an instrument panel.

6. An airbag apparatus according to claim 1, wherein the airbag comprises two sheets of base cloth.

7. An airbag apparatus according to claim 1, wherein a vent hole is formed in the sub-expansion part.

8. An airbag apparatus according to claim 1, wherein a vent hole is formed in a position of the main expansion part other than a position which receives a passenger.

9. An airbag apparatus according to claim 1, wherein the sub-expansion part has an amount of inflation that does not reach the front window panel.

10. An airbag apparatus according to claim 1, wherein the gas guide port is located at a lower surface of the airbag to be displaced toward the side of the main expansion part.

11. An airbag apparatus according to claim 9, wherein the main expansion part has a cylindrical straight part communicating with the gas guide port, and bellows part provided so as to extend from a prescribed point on an end portion of the straight part away from the gas guide port.

12. An airbag apparatus according to claim 9, wherein the bellows part of the main expansion part is wound and folded so as to be disposed along the inside of the straight part, so that the bellows part is rewound downward along a surface of an instrument panel.

13. An airbag apparatus according to claim 9, wherein the airbag comprises two sheets of base cloth.

* * * * *